US008142598B2

(12) United States Patent
Duvekot et al.

(10) Patent No.: US 8,142,598 B2
(45) Date of Patent: Mar. 27, 2012

(54) FILTER TUBE MAKING

(75) Inventors: Loren Duvekot, Goochland, VA (US); Michael S. Braunshteyn, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 263 days.

(21) Appl. No.: 12/339,228

(22) Filed: Dec. 19, 2008

(65) Prior Publication Data

US 2009/0165935 A1 Jul. 2, 2009

Related U.S. Application Data

(60) Provisional application No. 61/017,287, filed on Dec. 28, 2007.

(51) Int. Cl.

| | |
|---|---|
| ***B29C 65/02*** | (2006.01) |
| ***B29C 65/52*** | (2006.01) |
| ***B32B 37/06*** | (2006.01) |
| ***B32B 37/28*** | (2006.01) |
| ***B32B 38/04*** | (2006.01) |

(52) U.S. Cl. ..... 156/270; 156/202; 156/218; 156/304.2; 493/41

(58) Field of Classification Search .................. 156/203, 156/218, 270, 304.2; 493/41
See application file for complete search history.

(56) References Cited

U.S. PATENT DOCUMENTS

| | | | | | |
|---|---|---|---|---|---|
| 2,210,436 | A | * | 8/1940 | Weingand et al. | 426/135 |
| 3,400,032 | A | * | 9/1968 | Sexstone et al. | 493/41 |
| 3,476,367 | A | * | 11/1969 | Fleissner | 432/141 |
| 3,828,658 | A | * | 8/1974 | Brodbeck et al. | 493/41 |
| 3,943,835 | A | | 3/1976 | Luke et al. | |
| 4,160,407 | A | * | 7/1979 | Duym | 454/61 |
| 4,176,162 | A | * | 11/1979 | Stern | 423/245.3 |
| 4,179,323 | A | * | 12/1979 | Sigmon | 156/201 |
| 4,253,821 | A | * | 3/1981 | Bradshaw | 432/2 |
| 4,525,161 | A | * | 6/1985 | Luke | 493/42 |
| 5,169,481 | A | * | 12/1992 | Braunshteyn et al. | 156/378 |

FOREIGN PATENT DOCUMENTS

| | | |
|---|---|---|
| DE | 464411 | 8/1928 |
| DE | 599141 | 6/1934 |
| FR | 2300513 | 9/1976 |
| GB | 1210029 | 10/1970 |
| GB | 1538452 | 1/1979 |
| GB | 2171168 | 8/1986 |

* cited by examiner

*Primary Examiner* — Linda L Gray
(74) *Attorney, Agent, or Firm* — Connolly Bove Lodge & Hutz LLP

(57) ABSTRACT

A hollow filter tube is produced with a longitudinal seam and a fixed diameter. In the formation of the hollow tube glue is applied along a longitudinal side edge portion of an endless strip, and the strip is then formed into a tubular shape with an unglued longitudinal edge portion tucked directly under and against the glued side edge portion. The hollow tube is then heated to drive moisture from the glue and size and shape the hollow tube. Ultimately the formed hollow tube is cut into specific lengths.

8 Claims, 3 Drawing Sheets

9
12
14
16
18
20
22
24
26
28
30
32
34
36
38
40
42
44
46
48
50
52

FILTER TUBE MAKING

CROSS REFERENCE TO RELATED APPLICATION

The present application claims the benefit of provisional application Ser. No. 61/017,287, filed Dec. 28, 2007, for all useful purposes, and the specification and drawings thereof are included herein by reference.

BACKGROUND OF THE INVENTION

The present invention relates to filter tube making, and more particularly to an apparatus and method for forming a flat paper strip into a tubular shape for subsequent use in the formation of cigarette filters.

U.S. Pat. Nos. 3,517,480 and 3,603,058 illustrate and describe machines for the production of composite cigarette filters by directly flowing granular filter material from a storage hopper into a vertically oriented paper filter tube. Similarly, US Patent Application Publication 2002/0119874A1 describes another machine for producing compound cigarette filters that includes a series of rotating plates with cavities therein into which the granular filter material is deposited. The cavities ultimately are aligned with an open ended paper filter tube to facilitate deposit of the granular material into the tube.

Preformed paper filter tubes are utilized with machinery as described above for primarily producing 2-up (dual) cigarette filters. In each instance these filter tubes primarily comprise a hollow cylindrical tube with a central filter component such as cellulose acetate tow. After both ends of the filter tube are filled with granular material and sealed with solid filter segments a 2-up (dual) filter is produced which when combined with tobacco rods at each end thereof ultimately produces two complete cigarettes. When cuffing through the middle of the central filter component, each cigarette filter has a defined length. It is important that the length and inside diameter of the preformed filter tube be accurately controlled so that the tubes can then be easily and accurately filled utilizing vertical filling technology and machinery of the type described above. Such filter tubes may also be filled utilizing horizontal filing technology.

SUMMARY OF THE INVENTION

Accordingly, the primary object of the present invention is a method of producing hollow filter tubes in a highly economical manner and where the filter tubes have accurate predetermined dimensions.

Another object of the present invention is a method of producing hollow filter tubes which is relatively simple, but highly effective using high speed production techniques.

Still another object of the present invention is an apparatus for producing hollow filter tubes from an endless flat strip in an efficient and highly economical manner.

In accordance with the present invention, a method of producing a hollow filter tube with a longitudinal seam and a fixed diameter comprises the steps of continuously delivering an endless flat strip to a glue applicator where glue is applied along a longitudinal side edge portion of the strip. The strip with the glue on the longitudinal side edge portion moves to at least one forming station that functions to form the strip into a tubular shape while tucking an unglued longitudinal edge portion of the strip directly under and against the glued side edge portion thereof. The hollow tube is then heated at a vented heating chamber to drive moisture from the glue and thereby set the glue and size and shape the tube. Ultimately the formed hollow tube is cut to specific lengths at a cutter.

Preferably the method further includes the step of engaging the hollow tube after emerging from the heating chamber with at least one block that grips and further forms the tube into a desired final shape.

A continuous garniture belt is preferably utilized to deliver the endless flat strip to the glue applicator and to move the formed hollow tube to the cutter.

Also, in accordance with the present invention, apparatus is provided for producing a hollow filter tube with a longitudinal seam and a fixed diameter. Such apparatus includes a supply of an endless flat strip to be formed into a tubular shape. A glue applicator functions to apply glue along a longitudinal side edge portion of the flat strip, and an endless garniture belt delivers the flat strip to the glue applicator. The apparatus further includes at least one forming station downstream from the glue applicator constructed and arranged to form the endless flat strip into a tubular shape and to tuck an unglued longitudinal edge portion of the paper strip directly under and against the glued side edge portion thereof. A vented heating chamber downstream of the at least one forming station receives the formed tube to drive moisture from the glue to thereby set the glue and size and shape the tube. A cutter downstream of the vented heating chamber cuts the formed tube to specific lengths.

Preferably the apparatus of the present invention also includes a blocking assembly between the vented heating chamber and the cutter for gripping the tube and further forming the tube into a desired final shape.

The vented heating chamber is unique in that it includes heated passageways along the length thereof parallel to the path of travel of the formed tube as it moves through the chamber. Spaced part cavities along the length of the vented heating chamber are positioned adjacent the path of travel of the formed tube for providing communication between the heated passageways and the tube moving through the vented heating chamber.

BRIEF DESCRIPTION OF THE DRAWINGS

Novel features and advantages of the present invention in addition to those noted above will be become apparent to persons of ordinary skill in the art from a reading of the following detailed description in conjunction with the accompanying drawings wherein similar reference characters refer to similar parts and in which.

DETAILED DESCRIPTION OF THE INVENTION

Figures 1, 2, 3, 4, 5, 6, 7:
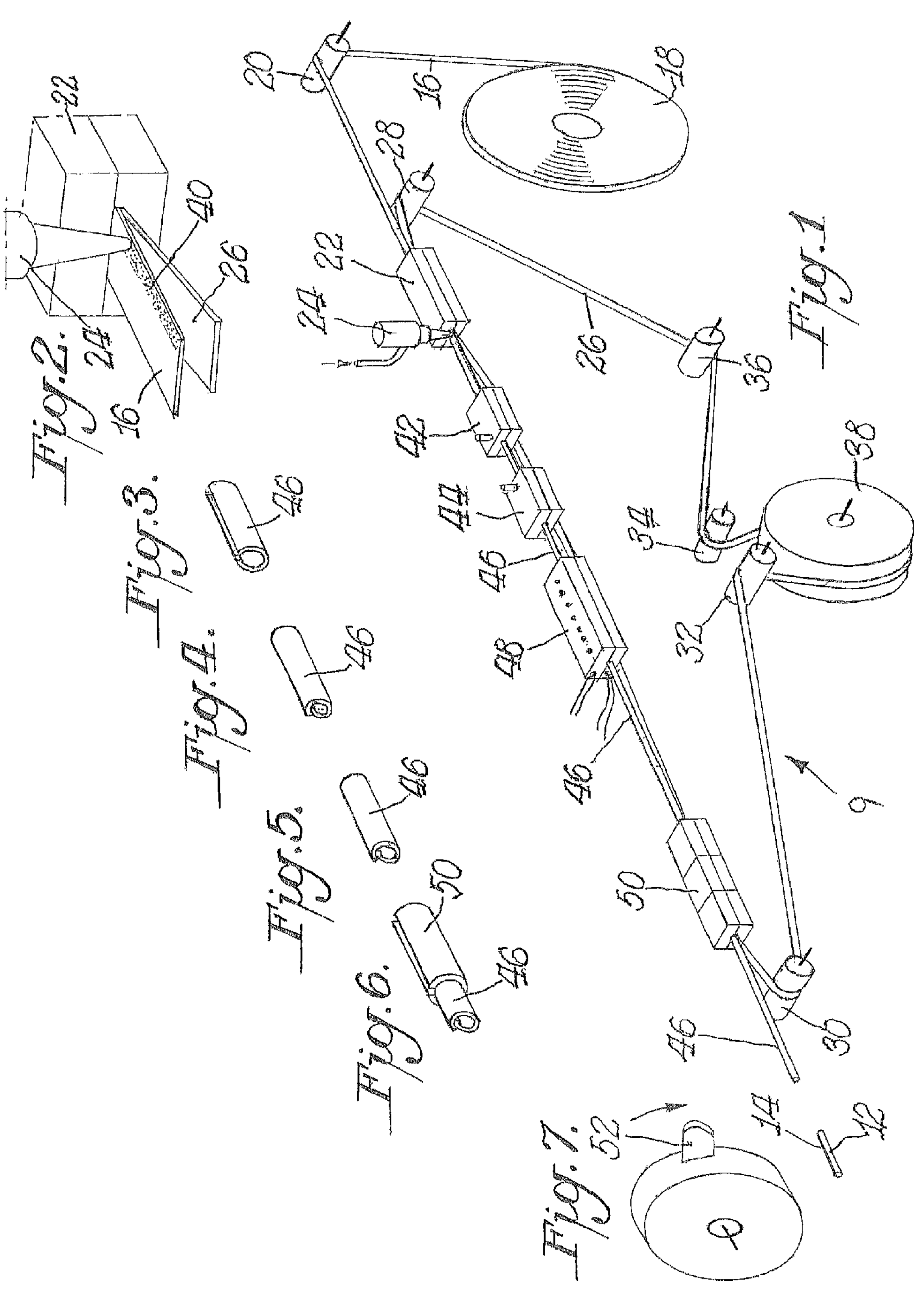
FIG. 1 is a diagrammatic perspective view of apparatus for producing a hollow filter tube, in accordance with the present invention.
FIG. 2 is a diagrammatic perspective view of the glue applicator of the apparatus shown in FIG. 1.
FIG. 3 is a perspective view of the endless flat strip preformed into a tubular shape.
FIG. 4 is a perspective view of the further formation of the hollow filter tube.
FIG. 5 is a perspective view of the hollow tube being sealed along its longitudinal edges.
FIG. 6 is a perspective view of the glued hollow tube being gripped to finalize its size and shape.
FIG. 7 is a diagrammatic perspective view of the cutter for cutting the hollow tube to specific lengths.

Referring in more particularity to the drawings, FIG. 1 shows an apparatus 9 for producing a hollow filter tube 12 having a longitudinal seam 14 and a fixed diameter. The hollow tube may be made of paper and have a diameter of 2.5 millimeters and an overall length of 88 millimeters with no more than 0.25 millimeters total curvature along its length. However, materials other than paper may be used, an other lengths and diameters may also be manufactured with the apparatus 9.

An endless paper strip 16 having a thickness of 0.089 millimeters and a width of 10 millimeters is the source from which the hollow filter tubes are made. The endless paper strip 16 is fed into the apparatus 10 from a paper bobbin 18, and the strip is trained over a roller 20 and then delivered to a guide block 22 and a glue applicator 24. The guide block stabilizes the paper strip 16 on an endless coated garniture belt 26 which functions to pull the paper strip through and along the various components comprising the apparatus 10.

The endless garniture belt 26 is trained around a series of rollers 28, 30, 32 and 34 as well as a tensioner 36 which may be pneumatically driven in order to properly tension the belt. The belt is also trained around a drum 38 driven by a variable speed motor (not shown) for the purpose of moving the belt long its path of travel.

The endless paper strip 16 engages the garniture belt 26 and together they pass through the guide block 22. Upon exiting the guide block glue 40 is applied along a longitudinal edge portion of the flat paper strip 16 by the glue applicator 24 as shown in FIG. 2.

The flat paper strip 16 with glue along a longitudinal side edge portion thereof then travels through several forming blocks 42, 44 where the flat paper strip is formed into a tubular shape 46, and an unglued longitudinal edge portion of the paper strip is tucked directly under and against the glued side edge portion thereof. FIG. 3 illustrate the initial formation of the tube in the forming block 40 while FIG. 4 shows the paper tube with the side edge portions thereof tucked under one another and secured together by the glue 40.

Figure 9:
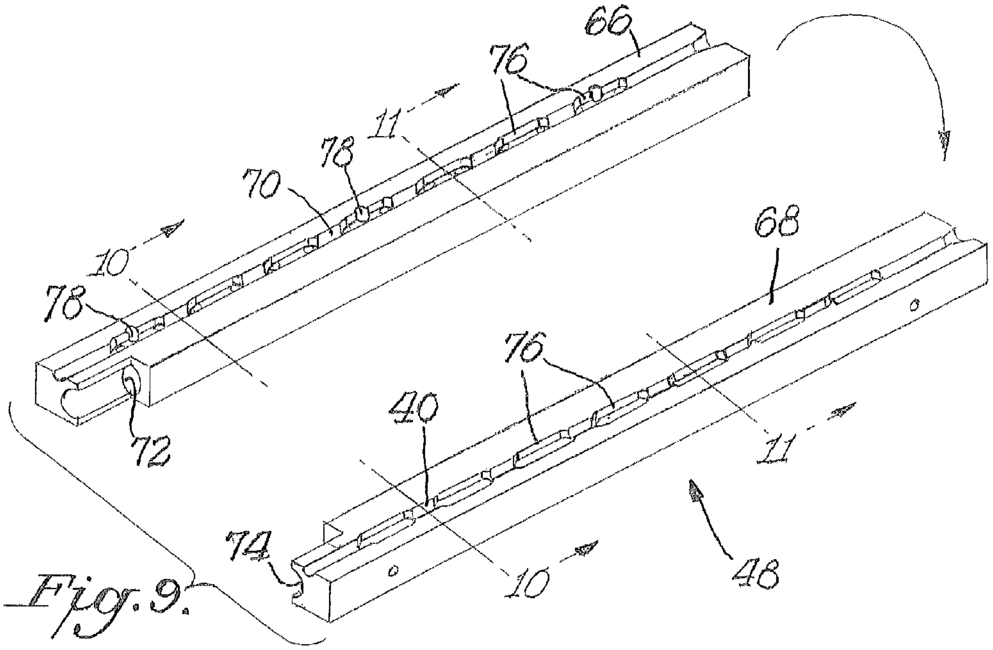
FIG. 9 is an exploded view of the interior blocks of the vented heating chamber through which the hollow tube is delivered.
Figure 10:
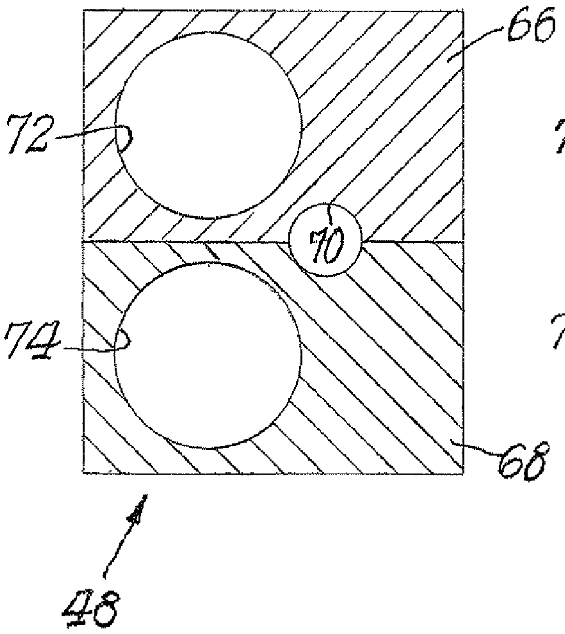
FIG. 10 is a sectional view taken along line 10-10 of FIG. 9, but with the blocks assembled.
Figure 11:
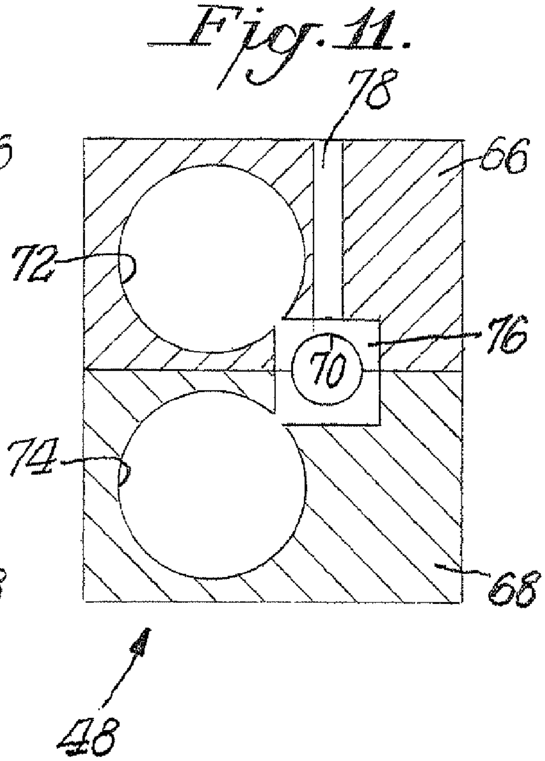
FIG. 11 is a sectional view taken along line 11-11 of FIG. 9, but with the blocks assembled.

Upon exiting the forming block 44, the formed paper tube 46 passes through a vented heating chamber 48 where moisture is driven from the glue to thereby set the glue and size and shape the hollow tube. Removal of moisture prevents undesirable curvature in the final product. Specifics of the vented heating chamber are shown in FIGS. 9-11 and explained in detail below.

FIG. 5 shows the formation of the hollow tube 46 as it moves through the vented heating chamber where the glue is set and the tube is sized and shaped.

Upon exiting the vented heating chamber 48, the hollow tube 46 passes through a series of stationary pulling blocks 50 that gently grip the tube as it is pulled through the blocks by the garniture belt 26. As explained above, the garniture belt is in engagement with the paper strip to pull the strip 16 through the guide block 22, and the formed hollow tube is in engagement with the garniture belt 26 for moving the tube through the pulling blocks 50. However, the garniture belt 26 is below the forming blocks 42, 44 and the vented heating chamber 48. The pulling blocks 50 function to finalize the size and shape of the formed hollow tube 46.

Upon exiting the pulling blocks 50 the formed hollow tube travels to a cutter 52 that cuts the formed tube to specific lengths. After such cutting the finished hollow tubes 12 cut to length are collected for future use in cigarette filter production.

Figure 8:
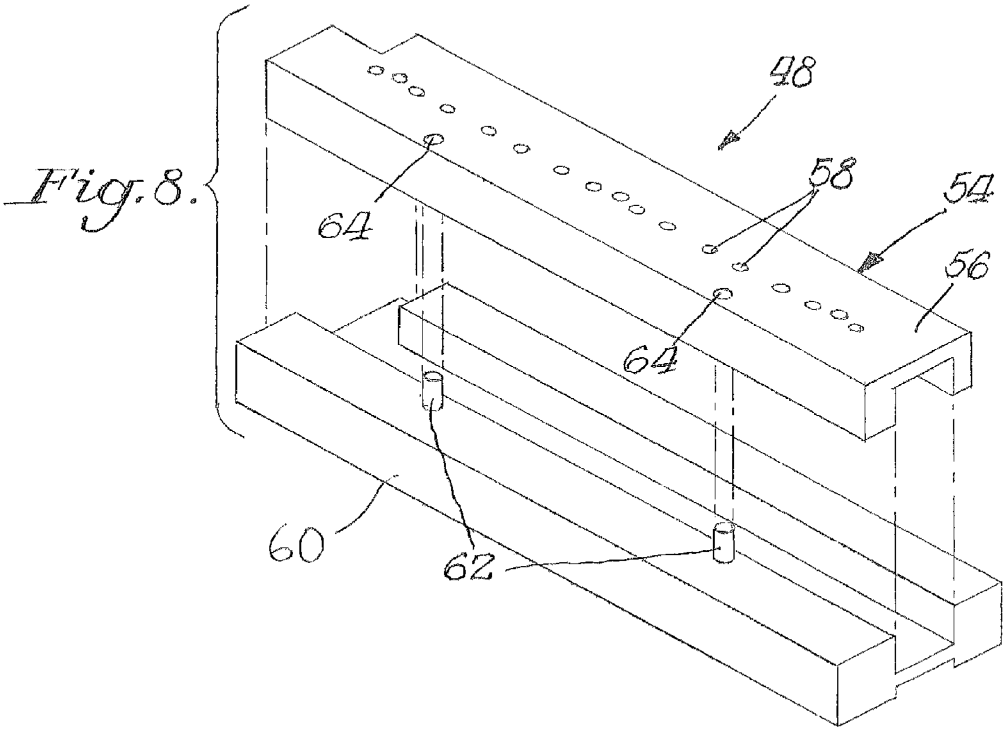
FIG. 8 is an exploded perspective view of the outer housing of the vented heating chamber.

FIGS. 8 and 9 illustrate details of the vented heating chamber 48. The chamber includes an outer housing 54 having an upper half 56 with vent holes 58 and lower half 60. Alignment pins 62 on the lower half enter openings 64 in the upper half when the housing 54 is fully assembled.

The interior of the vented heating chamber 48 includes upper and lower blocks 66 and 68, respectively, that define a central passageway 70 through which the hollow tube 46 travels as it moves through the vented heating chamber. Outer passageways 72, 74 are positioned adjacent the central passageway 70, and these outer passageways carry heated air or stream in order to heat the upper and lower blocks 66, 68 which in turn heat the hollow paper tube. Spaced apart cavities 76 along the length of the central passageway 70 provide communication between the heated outer passageways 72, 74 and the hollow paper tube moving through the vented heating chamber. Vents 78 in the upper block 66 of the vented heating chamber 48 communicate with the vent holes 58 in the upper half 56 of the outer housing 54 to provide escape of moisture driven from the glue 40.

What is claimed is:

1. A method of producing a hollow filter tube with a longitudinal seam and a fixed diameter comprising the steps of:

continuously delivering an endless flat strip to a glue applicator;

applying glue along a longitudinal side edge portion of the flat strip;

moving the flat strip with glue along a longitudinal side edge portion thereof to at least one forming station that forms the strip into a hollow tube while tucking an unglued longitudinal edge portion of the flat strip directly under and against the glued side edge portion thereof;

heating the hollow tube in a vented heating chamber to drive moisture from the glue and thereby set the glue and the size and shape of the hollow tube; and cutting the formed hollow tube into specific lengths.

2. A method of producing a hollow filter tube with a longitudinal seam and a fixed diameter comprising the steps of:

continuously delivering an endless flat strip to a glue applicator;

applying glue along a longitudinal side edge portion of the flat strip;

moving the flat strip with glue along a longitudinal side edge portion thereof to at least one forming station that forms the strip into a hollow tube while tucking an unglued longitudinal edge portion of the flat strip directly under and against the glued side edge portion thereof;

heating the hollow tube in a vented heating chamber to drive moisture from the glue and thereby set the glue and the size and shape of the hollow tube;

cutting the formed hollow tube into specific lengths; and engaging the hollow tube downstream of the vented heating chamber with at least one block that grips and further forms the tube into a desired final shape.

3. The method of claim 1, further including the step of utilizing an endless garniture belt to deliver the flat strip to the glue applicator and to move the formed hollow tube forward whereby the hollow tube is cut to specific lengths.

4. An apparatus for producing a hollow filter tube with a longitudinal seam and a fixed diameter comprising:

a supply of an endless flat strip to be formed into a tubular shape;

a glue applicator for applying glue along a longitudinal side edge portion of the endless flat strip;

an endless garniture belt for delivering the flat strip to the glue applicator;

at least one forming station downstream from the glue applicator, wherein the forming station is constructed and arranged to form the endless flat strip into a tubular shape and to tuck an unglued longitudinal edge portion of the strip directly under and against the glued longitudinal side edge portion thereof;

a vented heating chamber downstream from the at least one forming station, wherein the vented heating chamber is constructed and arranged to receive the formed hollow tube and to drive moisture from the glue to thereby set the glue and size and shape the tube; and a cutter downstream of the vented heating chamber for cutting the formed hollow tube to specific lengths.

5. An apparatus for producing a hollow filter tube with a longitudinal seam and a fixed diameter comprising:

a supply of an endless flat strip to be formed into a tubular shape;

a glue applicator for applying glue along a longitudinal side edge portion of the endless flat strip;

an endless garniture belt for delivering the flat strip to the glue applicator;

at least one forming station downstream from the glue applicator, wherein the forming station is constructed and arranged to form the endless flat strip into a tubular shape and to tuck an unglued longitudinal edge portion of the strip directly under and against the glued longitudinal side edge portion thereof;

a vented heating chamber downstream from the at least one forming station, wherein the vented heating chamber is constructed and arranged to receive the formed hollow tube and to drive moisture from the glue to thereby set the glue and size and shape the tube;

a cutter downstream of the vented heating chamber for cutting the formed hollow tube to specific lengths; and a blocking assembly functionally positioned between the vented heating chamber and the cutter, wherein the blocking assembly is constructed and arranged to grip the hollow tube and further form the tube into a desired final shape.

6. The apparatus of claim 4, wherein the vented heated chamber comprises heated passageways along the length thereof parallel to the path of travel of the formed hollow tube as it moves through the chamber.

7. The apparatus of claim 6, wherein the vented heated chamber further comprises spaced apart cavities along the length thereof adjacent the path of travel of the formed hollow tube, wherein the spaced apart cavities provide communication between the heated passageways and the hollow tube moving through the vented heated chamber.

8. The apparatus of claim 4, wherein the endless flat strip is paper.

* * * * *